US005328109A

United States Patent [19]

Takahashi

[11] Patent Number: 5,328,109

[45] Date of Patent: Jul. 12, 1994

[54] COIL WINDING DEVICE HAVING A TURRET ROTATABLE BETWEEN A WINDING POSITION AND A TAPING POSITION

[75] Inventor: Yoshikazu Takahashi, Toda, Japan

[73] Assignee: Nittoku Engineering Kabushiki Kaisha, Saitama, Japan

[21] Appl. No.: 963,147

[22] Filed: Oct. 19, 1992

[51] Int. Cl.[5] ....................... H01F 41/08; H02K 15/09

[52] U.S. Cl. .................................................. 242/7.08

[58] Field of Search ....................242/7.03, 7.08, 7.23, 242/7.09; 156/446, 447

[56] References Cited

U.S. PATENT DOCUMENTS

| | | | |
|---|---|---|---|
| 4,055,310 | 10/1977 | Bonaiti | 242/7.08 |
| 4,470,552 | 9/1984 | Parham, Jr. et al. | 242/7.03 |
| 4,722,486 | 2/1988 | Camardella | 242/7.03 |
| 4,809,917 | 3/1989 | Tsuchiya . | |
| 4,878,628 | 11/1989 | Takeda et al. | 242/7.08 |
| 4,951,889 | 8/1990 | Camardella et al. . | |

FOREIGN PATENT DOCUMENTS

| | | |
|---|---|---|
| 3815998 | 12/1988 | Fed. Rep. of Germany . |
| 63-280404 | 11/1988 | Japan . |
| 2214533 | 9/1989 | United Kingdom . |

OTHER PUBLICATIONS

Patent Abstracts of Japan, vol. 14, No. 161 (E-909) 28 Mar. 1990 & JP-A-20 18 915 (Matsushita Electric) 23 Jan. 1990 (abstract).

*Primary Examiner*—Andrew M. Falik
*Attorney, Agent, or Firm*—Jordan and Hamburg

[57] ABSTRACT

A coil manufacturing device includes a turret having a spindle which turns a bobbin, a winding unit which winds wire on the rotating bobbin, and a taping unit which tapes the wire wound on the bobbin. A mechanism moves the spindle between the winding unit and the taping unit, and another mechanism changes over the wire supplied to the winding unit so that wire change-over and taping can be performed simultaneously. The winding unit includes a nozzle bar, a nozzle device provided on the nozzle bar for supplying the wire, a clamping device on the nozzle bar for holding an end of the wire and a nozzle displacement device for supporting the nozzle bar and moving it in three dimensions.

2 Claims, 6 Drawing Sheets

COIL WINDING DEVICE HAVING A TURRET ROTATABLE BETWEEN A WINDING POSITION AND A TAPING POSITION

FIELD OF THE INVENTION

This invention relates to a coil winding device which winds and tapes a wire on a bobbin.

BACKGROUND OF THE INVENTION

Transformers are generally manufactured by winding and taping a wire alternately so as to build up a plurality of wire layers. A coil winding device wherein this operation is performed by a simple system is disclosed in Japanese Tokkai Sho 63-280404 published by the Japanese Patent Office.

This device comprises a nozzle holder and taping device supported by a supporting member such that they are free to move in three dimensions X, Y, Z. The winding operation is performed by rotating a bobbin supported on a spindle, supplying it with wire from a nozzle supported by the nozzle holder, and tying the wire by displacing the nozzle. Tape is then wound on the bobbin by activating a taping device.

If wires of different type or diameter are to be wound on the same bobbin, the wire has to be changed over. In this device, however, the winding position and taping position are the same, and the nozzle holder and taping mechanism are supported by the same supporting member. If it is attempted to install a separate wire change-over mechanism, therefore, the taping device is an obstruction.

Further, even if a wire change-over mechanism can be installed, the winding, taping and change-over of the wire are all performed at the same position. These operations can therefore be performed only sequentially, and the time required to perform the whole process is consequently longer.

SUMMARY OF THE INVENTION

It is therefore an object of this invention to perform wire change-over and taping operations without interfering with one another.

It is a further object of this invention to perform the whole coil winding process, including winding the wire on a bobbin, taping it and changing over the wire, efficiently in a short period of time.

In order to achieve the above objects, this invention provides a coil winding device comprising a turret having a spindle which is adapted to rotate a bobbin, a winding unit for winding a wire on the rotating bobbin and a taping unit for taping the wire wound on the bobbin. The turret is provided with a displacement mechanism which moves the spindle between the winding unit and the taping unit, and the winding unit is provided with a change-over mechanism which changes over the wire to be wound on the bobbin.

Preferably, the winding unit and taping unit are disposed on either side of the turret, and the displacement mechanism comprises a rotary actuator which rotates the turret through approximately 180 degrees such that the turret holds the spindle in either a position facing the winding unit or a position facing the taping unit.

Also preferably, the winding unit comprises a nozzle for supplying the wire, a nozzle bar having a fixed nozzle, a clamp provided on the nozzle bar for holding an end of the wire, and a nozzle displacement mechanism for supporting the nozzle bar and moving it in three dimensions.

Also preferably, the wire change-over mechanism comprises a rack for holding a plurality of the nozzle bars, and a displacement arm for transferring the nozzle bar between the rack and the nozzle displacement mechanism.

The details as well as other features and advantages of this invention are set forth in the remainder of the specification and are shown in the accompanying drawings.

DESCRIPTION OF THE PREFERRED EMBODIMENTS

Figure 1:
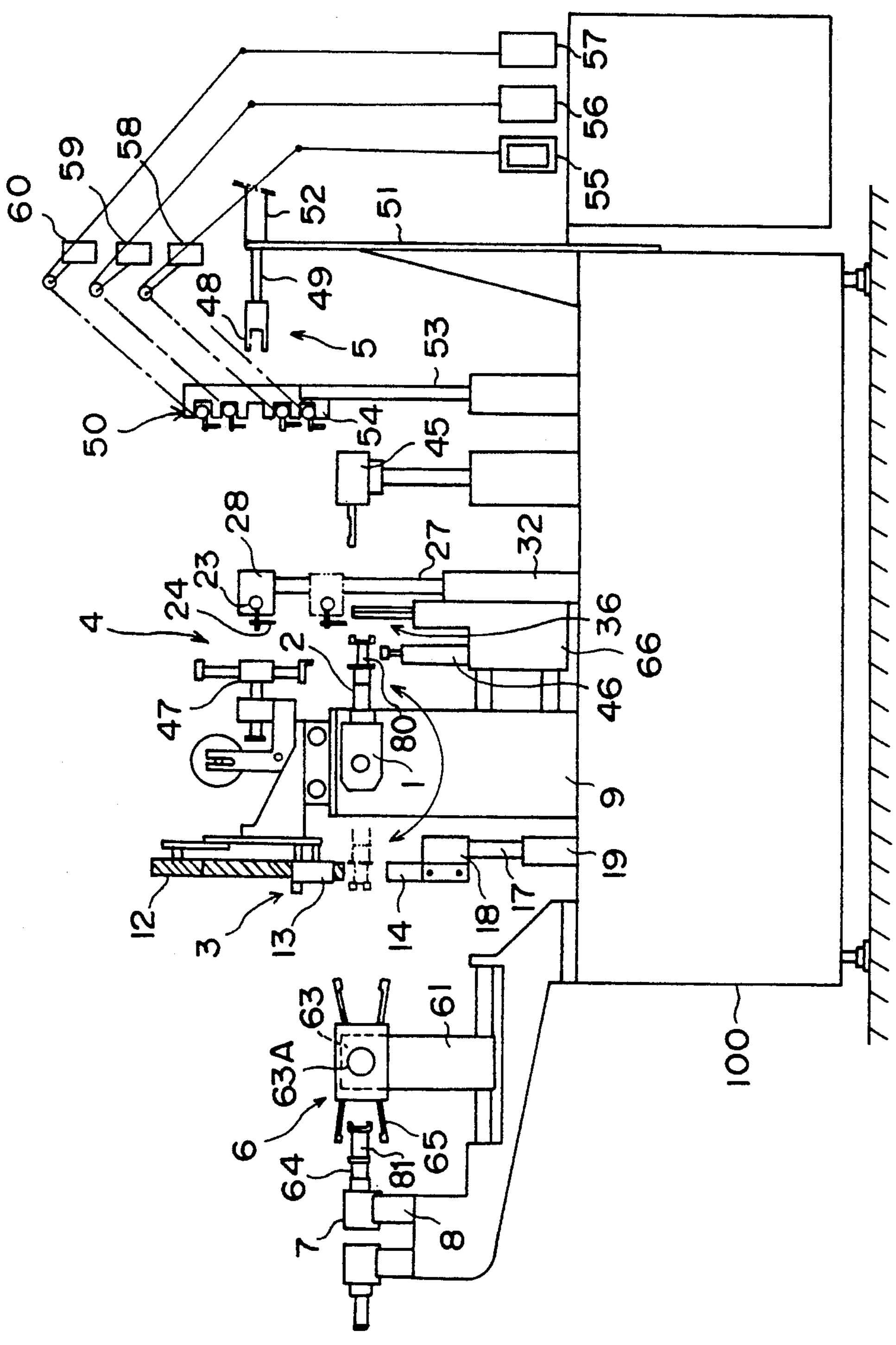
FIG. 1 is a schematic side view of a coil winding device according to this invention.

Referring to FIG. 1 of the drawings, a pair of columns 9 stands on a base 100, a turret 1 being supported between these columns 9.

Figure 2:
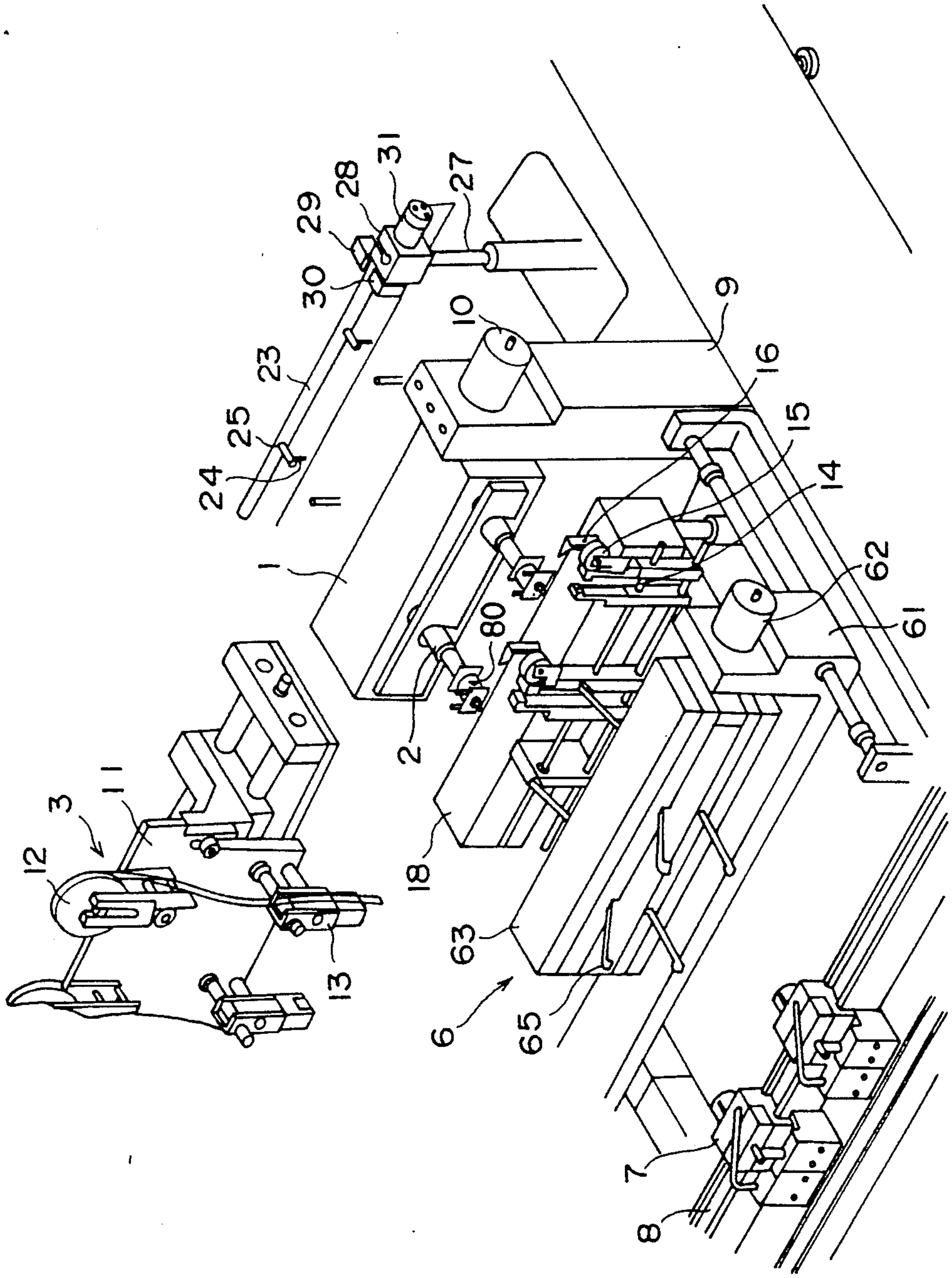
FIG. 2 is a perspective view of a nozzle bar, taping unit, turret, transfer mechanism and conveyor according to this invention.

As shown in FIG. 2, the turret 1 is connected to a rotary actuator 10 fixed on a column 9, the turret 1 being turned through 180 degrees in the direction of the arrow in FIG. 1 by driving the rotary actuator 10.

As shown in FIG. 2, a spindle 2 is attached to the turret 1. The spindle 2 supports a bobbin 80 used for winding a wire, and is rotated by a motor, not shown, inside the turret 1.

The bobbin 80 supported by the spindle 2 moves between two positions depending on the rotation position of the turret 1. In one position, winding is performed by a winding unit 4, while in the other position, taping is performed by a taping unit 3.

The taping unit 3 comprises a tape holder 12 and tape guide 13 fixed on a bracket 11 to the upper part of the column 9, a tape clamp 14 which grips the end of the tape below the holder 12 and guide 13, a roller 15 which smooths the tape on the bobbin 80, and a tape cutter 16.

Figure 3:
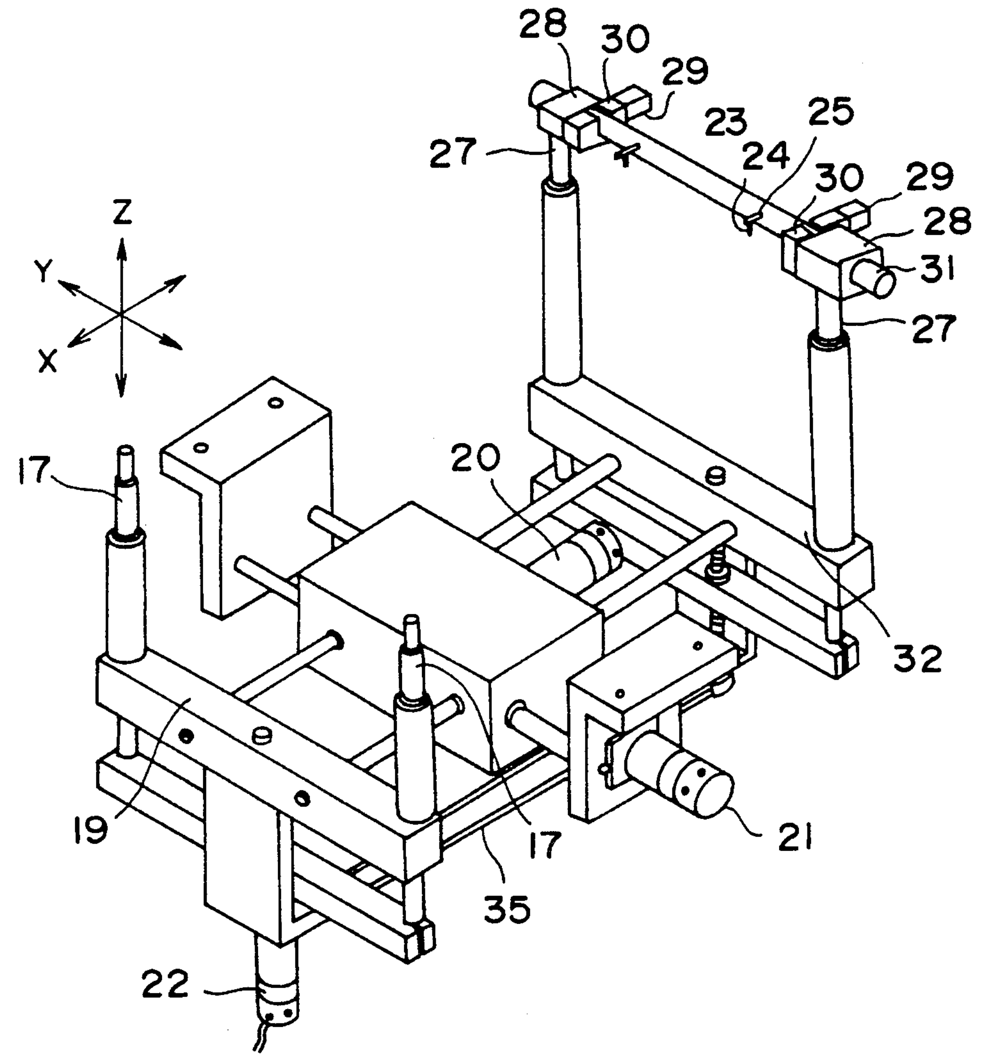
FIG. 3 is a perspective view of a taping unit and nozzle bar displacement mechanism according to this invention.
Figure 4:
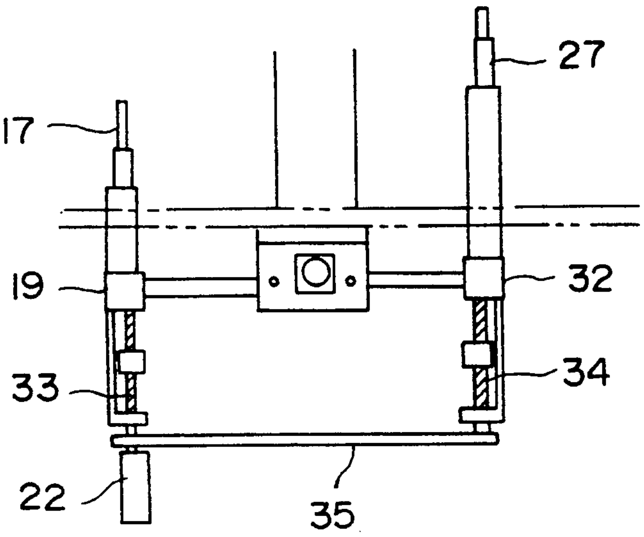
FIG. 4 is a side of the displacement mechanism.

The tape clamp 14, roller 15 and tape cutter 16 are fixed to a taping platform 18 supported by a pair of slide rods 17. As shown in FIGS. 3 and 4, the slide rods 17 are supported by a sliding base 19 mounted on the base 100 such that the base 19 is free to be moved along axes X, Y and Z by motors 20, 21 and 22.

When taping is performed, the end of a tape projecting from the tape holder 12 through the tape guide 13 is gripped by the tape clamp 14, and the sliding base 19 is moved by the motors 20, 21 and 22 so as to cause the tape to adhere to the bobbin 80. After winding the tape onto the outer circumference of the bobbin 80 by rotating the spindle 2 while the tape is smoothed on the bobbin 80 by the roller 15, the tape is cut by the tape cutter 16.

Figure 5:
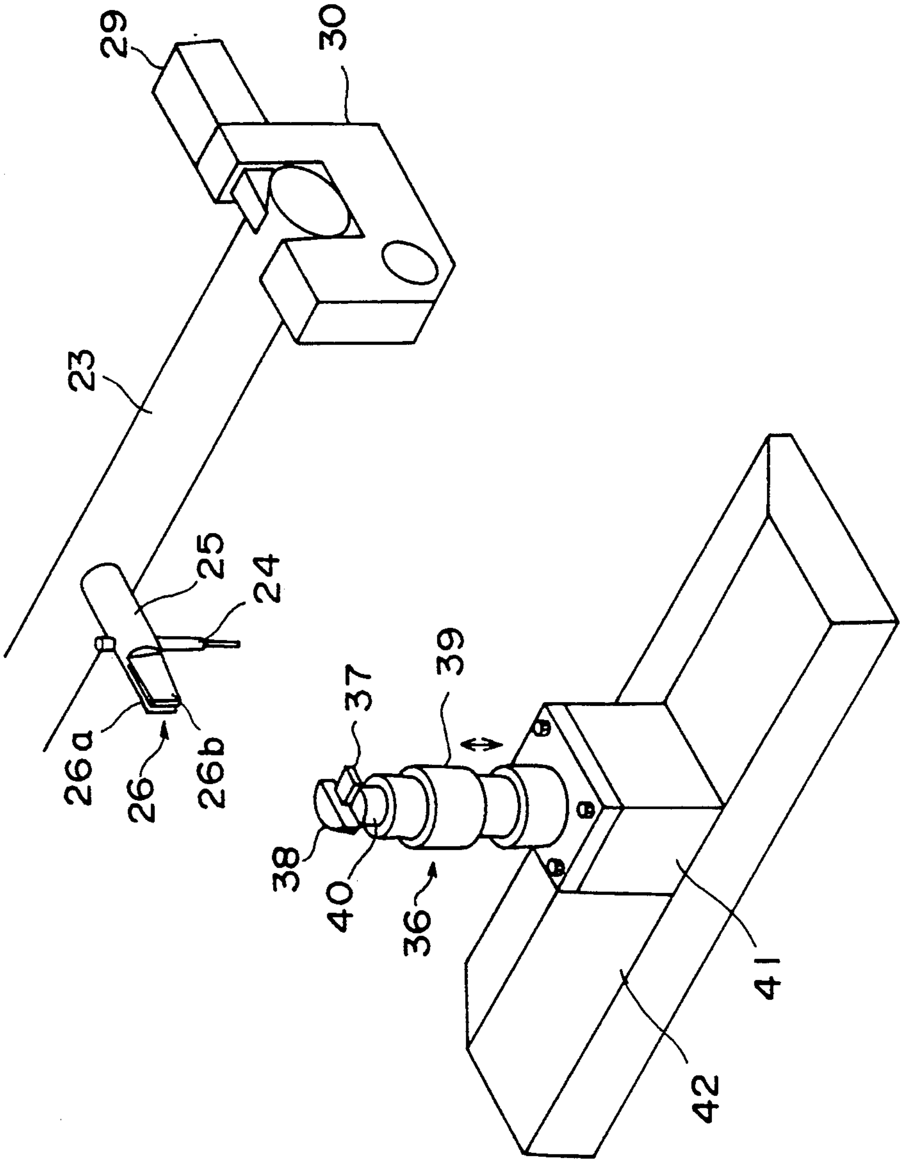
FIG. 5 is a perspective view of the essential parts of the nozzle bar and a wire tying device according to this invention.

The wire winding unit 4 comprises a nozzle bar 23 to which is fixed a nozzle 24, a wire tying device 36, a wire end processing device 45 and a wire clamp device 46. As shown in FIG. 5, the nozzle 24 is fixed to a nozzle holder 25 projecting at right angles to the nozzle bar 23 such that the nozzle is oriented downwards. Wire is fed from the tip of the nozzle 24, this wire being supplied to the nozzle at a predetermined tension from tensioners 58 to 60 to be described hereinafter.

The nozzle holder 25 consists of a clamp 26 having a pair of plates 26*a* and 26*b* which grip the end of the wire at its tip.

The nozzle bar 23 is supported on the upper ends of a pair of sliding rods 27 mounted on a sliding base 32 which moves in the X, Y and Z axial directions together with the sliding base 19. A platform 28 is fixed to the upper ends of the sliding rods 27, a bar support 30 being supported on the platform 28 such that it can be rotated by a rotary actuator 31. The two ends of the nozzle bar 23 rest on this bar support 30 such that they can be engaged or disengaged by an air cylinder 29.

The sliding bases 19 and 32 are moved in the X axis direction by the motor 20, and the Y axis direction by the motor 21. Further, as shown in FIG. 4, the sliding base 19 is supported by a ball race 33, and the sliding base 32 by a ball race 34. These ball races 33 and 34 are connected by a belt 35, the sliding bases 19 and 32 being moved up and down together in the Z direction by driving the belt 35 with the motor 22. Although the sliding bases 19 and 32 move together, a construction is also possible wherein they move separately.

Figure 6:
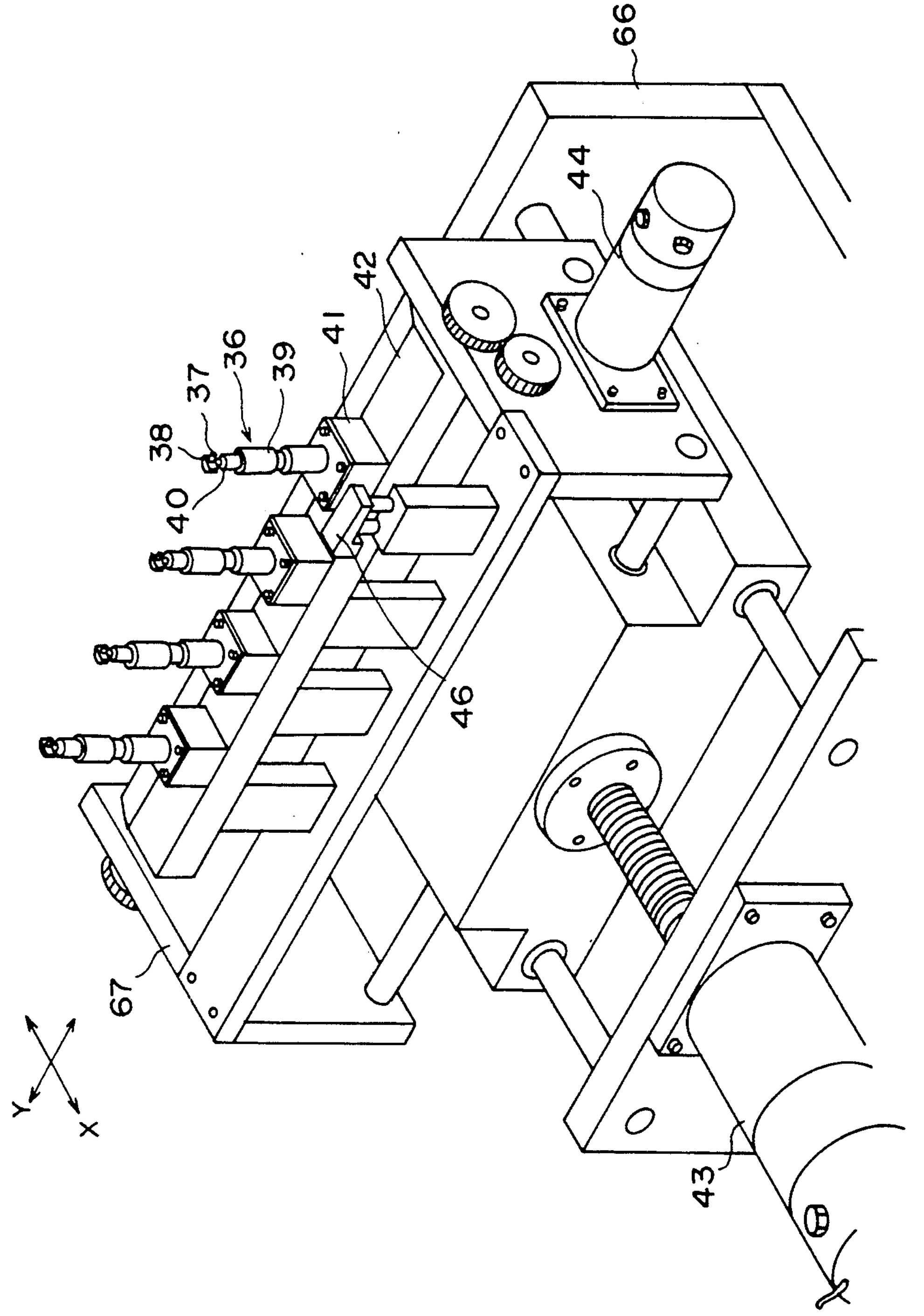
FIG. 6 is a perspective view of a displacement mechanism of the wire tying device according to this invention.

The wire tying device 36 is provided below the bobbin 80 in its winding position. As shown in FIGS. 5 and 6, the wire tying device 36 consists of a clamp pin 37 formed together with a semicircular tiepin 38 in a one-piece construction, fixed to the tip of a rod 40 on which is threaded a wire discharge sleeve 39. A small wedge-shaped gap is formed between the clamp pin 37 and the tip of the rod 40 so as to hold the wire.

The rod 40 is supported by a box 41 on a supporting plate 42. The box 41 houses an air actuator which moves the rod 40 up or down. The supporting plate 42 is attached to a sliding base 67 inside a holder 66 fixed to the column 9, this base 67 being moved in the X axis direction by a motor 43 and in the Y axis direction by a motor 44.

The wire discharge sleeve 39 has the function of removing wire tied to the outer circumference of the tiepin 38, and is slid up and down over the rod 40 by an actuator, not shown.

The wire end processing device 45 is supported on the base 100. The wire end processing device 45 is supported and moved in the X, Y, Z axial directions by separate displacement mechanisms, not shown, which are similar to the sliding bases 19 and 32. The device 45 ties the wire to a first terminal pin fixed to a rim of the bobbin 80 between the nozzle 24 and the tiepin 38, and then cuts the end of the wire.

The wire clamp device 46, which is fitted to the sliding base 67, holds a part of the wire to the outer circumference of the bobbin 80 to make a bent part when winding begins after tying the wire to the first terminal pin of the bobbin 80, and when the wire is tied after winding to a second terminal pin also fixed to the rim of the bobbin 80. A tape sticking device 47 is also supported on the column 9 above the bobbin 80 in its winding position in order to fix these bent parts to the outer circumference of the bobbin 80 by means of pieces of tape.

In the aforesaid construction, when winding begins, the wire between the nozzle 24 and the clamp 26 is gripped by the clamp pin 37 and the rod 40, and wound several times on the tiepin 38. Next, the end processing device 45 ties the wire between the tiepin 38 and nozzle 24 on the first terminal pin of the bobbin 80, and cuts the wire on the side of the tiepin 38. From the first terminal pin of the bobbin 80, the wire is guided to the outer circumference of the bobbin 80, the bent part formed by the clamp device 46 is attached to the bobbin 80 by the tape sticking device 47, and the spindle 2 is rotated as wire is supplied by the nozzle 24 so as to wind the wire on the bobbin 80.

After winding is finished, a bent part of the wire is again fixed on the outer circumference of the resulting coil by the clamp device 46 and tape sticking device 47, and the wire is tied to the tiepin 38. The wire between the bent part and the tiepin 38 is then tied to the second terminal pin of the bobbin 80, and its end cut on the side of the tiepin 38 by the end processing device 45.

The end of the wire remaining on the tiepin 38 is removed by the upward movement of the wire discharge sleeve 39.

A wire change-over mechanism 5 is provided on the base 100 at the rear of the wire winding unit 4. As shown in FIG. 1, this change-over mechanism 5 comprises an arm 49 provided with a pair of hooks 48 to grip the nozzle bar 23 which is supported on the platform 28 from the rear, and a rack 50 which carries a plurality of nozzle bars 23.

The arm 49 is supported horizontally by a column 51 mounted on the base 100, and is made to elongate or contract in the X axis direction by an air cylinder, not shown.

The rack 50 is provided with a plurality of crosspieces 54 fixed in stepwise fashion on a pair of poles 53. Nozzle bars 23 which are not in use are held on these crosspieces. The rack 50 is moved up or down in the Z axis direction by a motor, not shown.

Various wires are stored on wire frames 55 to 57. Tensioners 58 to 60 are provided between the frames 55 to 57 and the rack 50 so as to keep the wires supplied from the frames to the nozzle bars 23 under a predetermined tension.

Change-over of the wire to be wound on the bobbin 80 is performed by the mechanism 5 which changes over the nozzle bars 23. In such a case, the arm 49 is extended toward the turret 1 through an empty space in the rack 50 so as to grip a nozzle bar 23 supported on the platform 28 by means of the hooks 48. Next, the air cylinder 29 is released, and after lowering the slide rods 27, the arm 49 is retracted so as to lay the nozzle bar 23 on a crosspiece of the rack 50. The hooks 48 are then released, and the arm 49 is further withdrawn. This completes recuperation of the nozzle bar 23.

Next, the rack 50 is moved up or down in the Z axis direction until a nozzle bar 23 which it is desired to use is at the same height as the arm 49. The arm 49 is extended to grip this nozzle bar 23 with the hooks 48, and the arm 49 is further extended so as to carry the bar 23 above the platform 28. The slide rods 27 are then raised so that the bar 23 is laid on the platform 28, and the bar is engaged with the platform 28 by the air cylinder 29.

The change-over of nozzle bars 23 is accomplished in this manner. Moreover, by reversing the position of the turret 1, taping of the bobbin 80 can be performed while the change-over operation is proceeding.

A transfer mechanism 6 which changes over bobbins is installed on the side of the taping unit 3 opposite to the turret 1. As shown in FIG. 2, the transfer mechanism 6 comprises a conveyor 8 provided with pallets 7 which move in the Y direction, and a receiving platform 63 which transfers the bobbin between the turret 1 and pallets 7.

The receiving platform 63 is fixed to a bracket 61 which moves in the X direction on the base 100, and it is made to pivot through 180 degrees about an axis 63A by means of a rotary actuator 62. Clamps 65 which grip holds 64 formed on the bobbin are provided on both sides of the receiving platform 63.

The receiving platform 63 grips the holds 64 on a new bobbin 81 carried by the pallets 7 of the conveyor 8 by means of the clamps 65, and after pivoting, it moves toward the turret 1 so as to load the bobbin 81 on the spindle 2. Also the holds 64 on a bobbin 80 previously loaded on the spindle 2 are gripped by the clamps 65, the bobbin 80 is removed from the spindle 2, and is then transferred to the pallets 7.

From the aforesaid description, this coil winding device will be seen to possess the following advantages.

The taping unit 3 is in a position different from that of the winding unit 4, so there is sufficient working space for both units and wire change-over can be performed without obstruction from the taping unit 3. Wire change-over can thus be automated, and the system can be readily adapted to a variety of different winding operations.

Further, taping and wire change-over are performed simultaneously so that working time is considerably shortened.

By providing the clamp 26 at the tip of the nozzle holder 25, the end of the wire is gripped in the vicinity of the nozzle 24 by means of a simple construction. The nozzle bar 23 therefore moves together with the end of the wire, and change-over or storage of the nozzle bar is easily performed.

Further, by gripping the wire in the wedge-shaped gap between the clamp pin 37 provided on the tiepin 38 and the rod 40, the wire can easily be fastened to the tiepin 38, and the tied wire is prevented from falling off the tiepin 38 when the nozzle 24 moves.

Winding of different types of wire can thus be combined with taping in any desired combination of operations. This is suitable for a coil winding device required to produce small quantities of many different products.

In the aforesaid example, the turret 1 rotates to move the spindle 2, but such a construction is also possible wherein the turret 1 moves forwards, backwards or laterally so as to move the spindle 2 between the winding unit 4 and taping unit 3.

The foregoing description of the preferred embodiments for the purpose of illustrating this invention is not to be considered as limiting or restricting the invention, since many modifications may be made by those skilled in the art without departing from the scope of the invention.

What is claimed is:

1. A coil winding device comprising:

a turret having spindle means for rotating a bobbin;

winding unit means, positioned adjacent the turret, for winding a wire on the rotating bobbin, said winding unit means being provided with change-over means for changing over the wire to be wound on the bobbin;

said winding unit means comprising a nozzle bar, nozzle means provided on said nozzle bar for supplying the wire, clamp means provided on said nozzle bar for holding an end of the wire, and nozzle displacement means for supporting the nozzle bar and moving it in three dimensions;

taping unit means, positioned adjacent the turret, for taping the wire wound on the bobbin;

said turret being provided with displacement means for moving said spindle means between the winding unit means and the taping unit means;

said winding unit means and taping unit means being disposed on either side of said turret;

said displacement means comprising rotary actuator means for rotating the turret through approximately 180 degrees such that the turret holds the spindle means in either a position facing the winding unit means or a position facing the taping unit means.

2. A coil winding device as defined in claim 1, wherein the change-over means comprises:

rack means for holding a plurality of said nozzle bars, and displacement arm means for selectively transferring each said nozzle bar between the rack means and the nozzle displacement means.

* * * * *